United States Patent
Ghosh et al.

(10) Patent No.: US 8,073,732 B1
(45) Date of Patent: Dec. 6, 2011

(54) MARKETING INCENTIVE PROGRAM

(75) Inventors: Debashis Ghosh, Charlotte, NC (US); Thayer Allison, Charlotte, NC (US); Sudeshna Banerjee, Waxhaw, NC (US); David Joa, Pacifica, CA (US); Mark Krein, Charlotte, NC (US); Kurt Newman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 503 days.

(21) Appl. No.: 12/170,961

(22) Filed: Jul. 10, 2008

(51) Int. Cl.
*G06Q 40/00* (2006.01)
(52) U.S. Cl. .......................................................... 705/14
(58) Field of Classification Search ...................... 705/14
See application file for complete search history.

(56) References Cited

U.S. PATENT DOCUMENTS

2003/0033237 A1* 2/2003 Bawri ............................. 705/37
2008/0296370 A1* 12/2008 Khandelwal et al. ......... 235/380

OTHER PUBLICATIONS

U.S. Appl. No. 11/740,130.

* cited by examiner

*Primary Examiner* — Jessica Lemieux
(74) *Attorney, Agent, or Firm* — Michael A. Springs; Moore & Van Allen PLLC; James C. Edwards

(57) ABSTRACT

Embodiments of the invention relate to systems, methods, and computer program products for providing a customer network in which customers are incentivized to "opt-in" to a marketing program. For example, the invention builds a network of customers, collects and stores customers' demographic information, compiles mailing lists based on list purchasers' requested demographic criteria, sells the compiled mailing lists to list purchasers, and compensates those customers included on the mailing lists.

17 Claims, 3 Drawing Sheets

MARKETING INCENTIVE PROGRAM

FIELD

In general, embodiments of the invention relate to systems, methods, and computer program products for providing a customer network in which customers are incentivized to "opt-in" to a marketing program and, more particularly, to building a network of customers, collecting and storing customers' demographic information, compiling mailing lists based on list purchasers' requested demographic criteria, selling the compiled mailing lists to list purchasers, and compensating those customers included on the mailing lists.

BACKGROUND

Businesses are increasingly utilizing targeted mailing lists to contact potential customers. For example, a business may identify a market segment that may be interested in the business's products and/or services. The business may define the market segment using criteria such as income level, shopping preferences, homeowner or renter, number of children, occupation, ethnicity, education level, age, or any other combination of demographics. After defining the market segment, the business purchases a mailing list consisting of customers within that market segment. Additionally, many businesses that buy and use these targeted mailing lists also desire to use permission-based marketing, where the customers' permission is obtained before the customers are added to the mailing list. For example, permission-based marketing only sends advertisements after customers "opt-in," rather than sending advertisements and then allowing customers to "opt-out." Many believe permission-based marketing is more effective and efficient than non-permission-based marketing because resources are not wasted sending advertisements to customers that are not interested in the products and/or services. Also, many believe permission-based marketing enables a business to advertise through direct mailing, yet keep intact, and to some extent foster, its integrity and goodwill.

However, most marketing companies that specialize in compiling and selling to businesses these targeted mailing lists have access to a limited number of customers and have a limited amount of information about those customers. What's more, because these marketing companies do not have an established relationship with customers, the marketing companies are unable to obtain permission from the customers. Accordingly, mailing lists provided by most marketing companies include a limited number of customers that did not give, permission.

Large institutions are well positioned to compile and sell comprehensive targeted mailing lists because these institutions have a large amount of information about a large number of customers. However, these institutions have been ineffective at obtaining permission from their customers.

SUMMARY

The systems, methods, and computer program products of embodiments of the invention provide a customer-data network having a marketing-incentive system that incentivizes customers to "opt-in" to a marketing program. For example, the customer-data network invites customers to join the network, collects and stores customers' demographic information, compiles mailing lists based on list purchasers' requested criteria, sells the compiled mailing lists to list purchasers, and compensates those customers included on the mailing lists.

Embodiments of the systems, methods, and computer program products provided herein also provide a credit-scoring system that generates an alternative-credit score for individual customers based on data available in the customer-data network. The data available in the customer-data network may be personal and financial data about the individual customers. The personal and financial data may be provided to the customer-data network from a trusted institution(s) having an established relationship with the individual customers and from the individual customers themselves. Financial institutions, such as banks and insurance companies, associated with the customer-data network may receive customers' alternative-credit scores and other personal and financial data, and, based thereon, the financial institutions may provide product-pricing information to the individual customers via the customer-data network.

Embodiments of the systems, methods, and computer program products provided herein also provide: various financial-planning tools; and product-pricing information based on individual customers' alternative-credit scores and personal and financial data. Embodiments of the systems, methods, and computer program products provided herein also provide, at the individual customer's requests, alternative-credit scores and personal and financial data to potential employers. In some embodiments, a fraud protection program is provided to protect customers' personal and financial information.

BRIEF DESCRIPTION OF THE DRAWINGS

Figure 1:
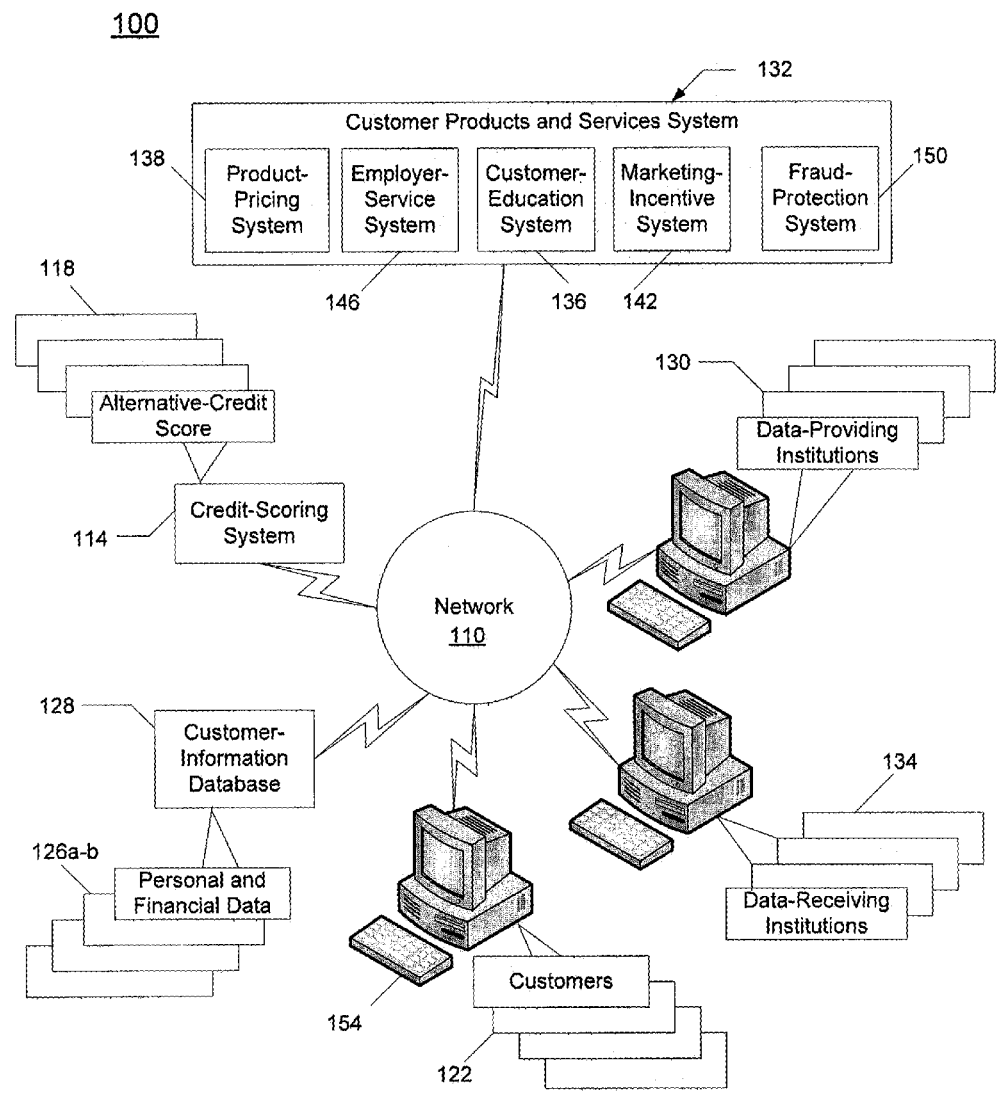
Figure 2:
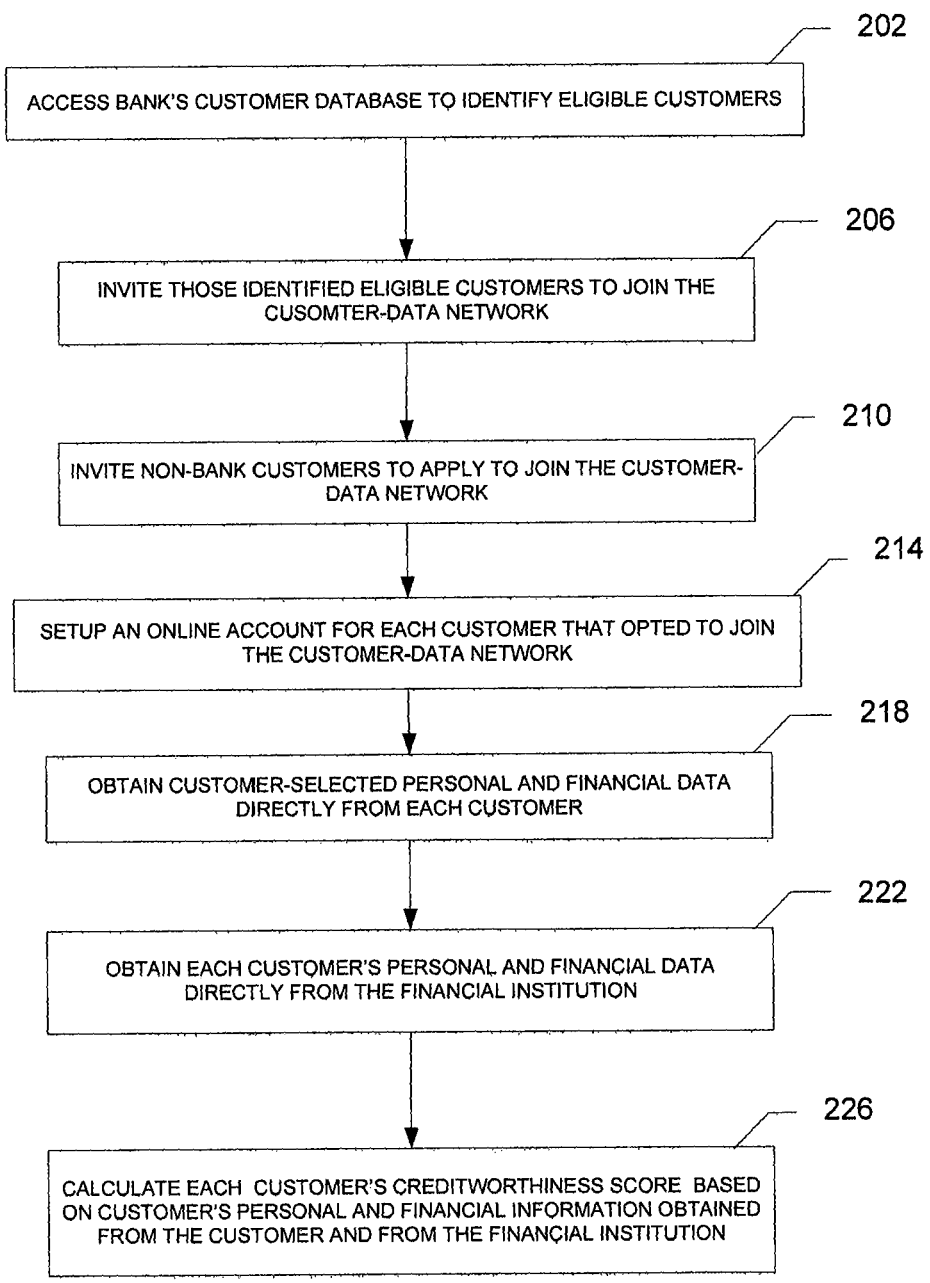
Figure 3:
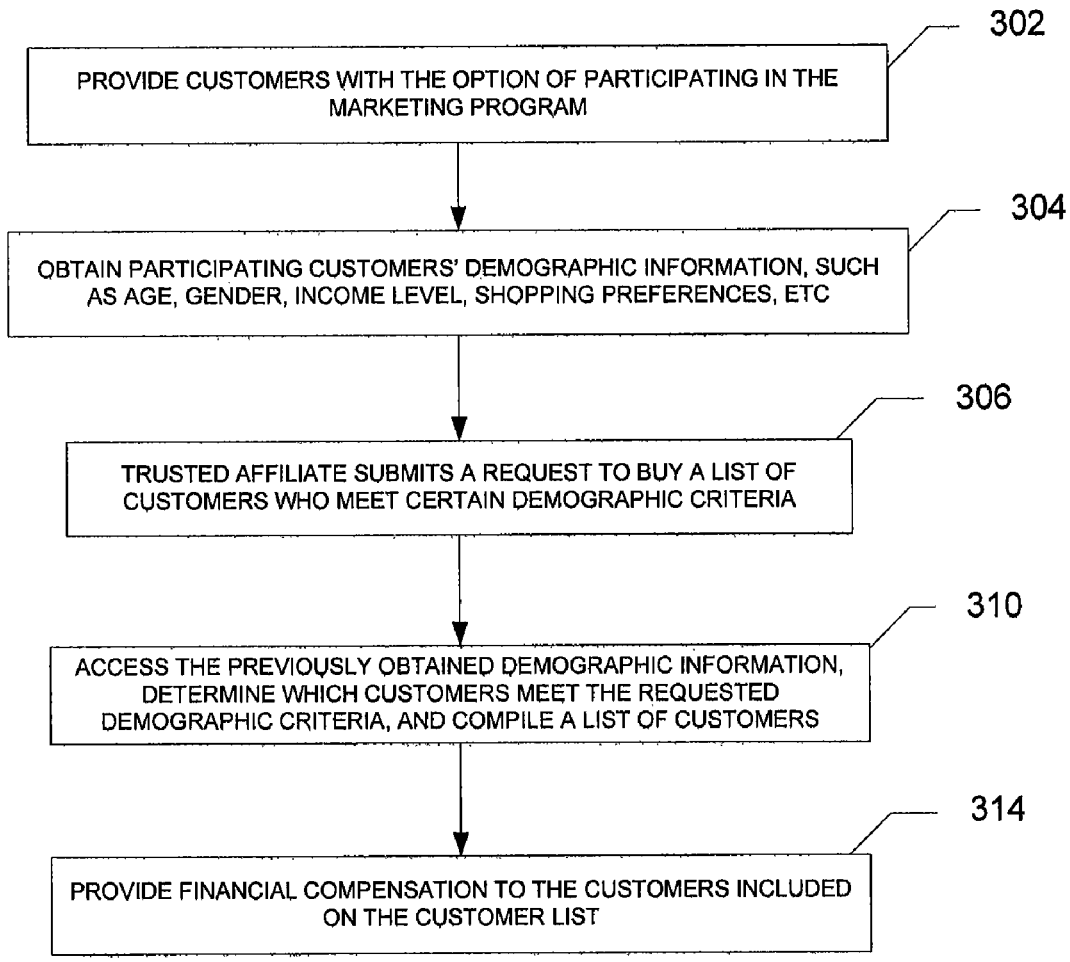

Having thus described embodiments of the invention in general terms, reference will now be made to the accompanying drawings, wherein:

FIG. 1 illustrates an environment in which the processes described herein are implemented according to one embodiment of the invention;

FIG. 2 is a flow chart illustrating an exemplary process of developing and maintaining a customer-data network, in accordance to one embodiment of the present invention; and FIG. 3 is a flow chart illustrating an exemplary process of using a marketing-incentive system to provide customers with financial incentive to "opt-in" to a marketing program.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely hardware embodiment, an entirely software embodiment (including firmware, resident software, micro-code, etc.), or an embodiment combining software and hardware aspects that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

In general terms, with reference to FIG. 1, described herein are various systems, methods, and computer program products for providing a customer-data network 110 having a credit-scoring system 114 that generates an alternative-credit score 118 for individual customers 122 based on data 126a-b stored in the customer-information database 128. The data 126a-b, for example, is personal and financial data about individual customers 122. Personal and financial data 126a is provided to the customer-data network 110 from a trusted data-providing institution(s) 130, such as a bank that holds a customer's checking and credit-card accounts, having an established financial relationship with the individual customers 122, whereas personal and financial data 126b is provided to the customer-data network 110 from the individual customers 122 themselves. Data-receiving institutions 134, such as potential creditors and insurance companies, associated with the customer-data network 110 receive customers' 122 alternative-credit scores 118 and other personal and financial data 126a-b, and, based thereon, the data-receiving institutions 134 can assess the risk associated with a particular customer 122.

The customer-data network 110 includes a customer-products-and-services system 132, which includes various subsystems for providing various products and services. For example, the illustrated customer-products-and-services system 132 includes: a customer education system 136 that provides various financial-planning tools; a product-pricing system 138 that provides customers 122 with product-pricing information based on individual customers' alternative-credit scores 118 and personal and financial data 126a-b; a marketing-incentive system 142 that incentivizes individual customers to sell their personal/marketing information to trusted affiliates associated with the customer-data network in exchange for direct compensation; an employer service system 146 that provides, at the individual customer's requests, alternative-credit scores 118 and personal and financial data 126a-b to potential employers; and a fraud protection system 150 that employs identity authentication to minimize fraud and to protect customers' personal and financial information 126a-b.

For illustrative purposes, the customer-data network 110 will be described herein as being administered by a bank to provide an alternative to the traditional means, e.g., CRA credit reports and scores, of meeting underwriting criteria and determining appropriate loan, credit and insurance rates. Because many of the bank's customers 122 perform the majority of their financial transactions with the bank, the bank is in a better position than an outside credit bureau, such as a CRA, in determining a customer's creditworthiness. Accordingly, the use of a credit report and reliance on a credit score from a CRA can be eliminated through the use of the customer-data network 110, which collects and analyzes personal and financial data 126b provided by the customer together with the bank's own personal and financial data 126a about the customer 122 to determine an alternative-credit score 118. Accordingly, the customer-data network 110 provides operational and cost efficiency in the underwriting process, by eliminating the costs associated with buying credit reports from CRAB and by eliminating the costs associated with inaccurate CRA credit reports. Inaccurate reports lead to opportunity costs from bypassing low-risk customers whose CRA credit score incorrectly indicates high-risk because of fraud or reporting mistake, and inaccurate reports lead to costs associated with engaging high-risk customers whose CRA credit score incorrectly indicates low-risk.

In this banking application, the bank is both a data-providing institution 130 and a data-receiving institution 134. This is because the bank 130/134 provides its own personal and financial data 126a about its customers 122 to the customer-data network 110 and because the bank 130/134 receives alternative-credit scores 118 and other personal and financial data 126b from the customer-data network 110. It should be appreciated that the bank can be either a data-providing institution 130 or a data-receiving institution 134, instead of being both. The bank can also be neither a data-providing institution 130 nor a data-receiving institution 134. In which case, the bank would simply administer the customer-data network 110 for use by other institutions. It should be appreciated that, instead of being administered by a bank, the customer-data network 110 can be administered by any third-party-service provider. Unless expressly stated otherwise, as used herein and in the claims, the term "customer" applies to any individual or any business or non-business entity that has a financial relationship with a financial institution, such as a bank or an insurance company.

Referring now to FIG. 2, a flow chart is provided that illustrates an exemplary process 200 of developing and maintaining the customer-data network 110 by identifying eligible customers 122, inviting those customers 122 to join the customer-data network 110, and obtaining personal and financial data 126a-b from those customers 122, in accordance to one embodiment of the present invention. It should, however, be appreciated that the procedure for developing and maintaining the customer-data network 110 may take any form to achieve the desired number of eligible customers 122 and personal and financial data 126a-b.

The bank 130/134 may require a customer 122 to meet certain standards before being eligible to participate in the bank's customer-data network 110. Accordingly, as illustrated by block 202, the procedure 200 generally begins with accessing the bank's 130/134 customer-information database 128 to identify eligible customers 122. For example, the bank 130/134 may require that the customer 122 have maintained continuous direct deposit of their paycheck with the bank 130/134 for the duration of a qualifying period, e.g., one year, and/or that the customer 122 have maintained the same physical address for this period. As such, a customer 122 having a longstanding, responsible relationship with the bank 130/134 can benefit from this longstanding relationship by participating in the customer-data network 110. As illustrated in block 206, after eligible customers 122 have been identified, those eligible customers are invited to join the customer-data network 110. To incentivize customers 122 to join, the bank 130/134 may offer free membership to the consumer-data network 110. The bank 130/134 may also offer customers 122 a rebate equal to a portion of the amount saved by the bank 130/134 not having to buy a credit report from a CRA.

As illustrated in block 210, the customer-data network 110 may be used by the bank 130/134 to attract new customers 122 by inviting non-bank customers to apply to join the customer-data network 110. For example, the bank 130/134 may provide a fee-based membership for non-bank customers 122 to participate in the customer-data network 110. The bank 130/134 may, for example, target "unbanked" customers 122 who, although may have a steady income and may be financially responsible, do not have an established credit history as normally used by the CRAs. For example, a recent immigrant or a recent-college graduate may have a steady income and may be financially responsible, but may not have a traditional credit history. The bank 130/134 asks these unbanked customers to provide financial information such as rent and recurring bill payment history to establish their alternative-credit score 118. This fee-based membership to the customer-data network 110 could potentially allow those previously outside of the credit mainstream to establish credit-worthiness and thus be accepted when applying for consumer credit.

As illustrated in block 214, an online account may be setup for each eligible customer that opted to join the customer-data network 110. For example, the bank 130/134 may provide a secure website that customers 122 may access via a user terminal 154 to setup their account. In block 218, customer-selected personal and financial information 126b is obtained from the customers 122. For example, customers 122 may access their online account to input, and upload documentation in support of their personal and financial data 126b. For example, customers 122 may upload personal and financial data 126b, such as W-2's, pay stubs, copies of tax returns, brokerage statements, and proof of collateral ownership. This personal and financial data 126b will help in the underwriting process and help qualify the customer 122 for the most attractive loan and revolving credit rate. Where necessary, the bank 130/134 may provide supporting computer hardware and software to enable customers 122 to upload documentation. This hardware and software, for example, may include document image uploading and storage hardware and software available at the bank's 130/134 respective branches to allow customers 122 to upload scanned documents to the customer-data network 110.

As represented by block 222, the bank 130/134 obtains personal and financial data 126a about the customers 122 from the bank's customer-information database 128. Personal and financial data 126a about a customer may also be obtained from other data-providing institutions 130 that are associated with the customer-data network 110. This personal and financial data 126a comprises, for example, the bank's 130/134 own relationship history with customers 122. This relationship history may include credit accounts and loans, late payments, and checking account balance information. As illustrated in block 226, the credit scoring system 114 calculates an alternative-credit score 118 for each customer 122 based on the personal and financial information 126a-b obtained from the customers 122 and from data-providing institutions 130. Instead of having to rely on a credit score provided by a CRA, the alternative-credit score 118 allows flexibility for a customer 122 in qualifying for the most attractive load, credit and insurance rates, because the alternative-credit score 118 is calculated based, in part, on personal and financial data 126b that is selected and submitted by the customer 122.

A secure website may be provided that allows customers 122 to view their respective accounts and to access and review, at any time, their personal and financial data 126a-b and their alternative-credit score 118. If customers 122 discover an error or inaccuracy in their account, they may submit a message to the bank 130/134 indicating the error or inaccuracy. The bank 130/134, in this example, administers the customer-data network 110. If the bank 130/134 fails to correct the error or inaccuracy in a predetermined period, the customer 122 receives financial compensation for each day beyond the predetermined period that the error or inaccuracy goes uncorrected. The predetermined period is determined by a service level agreement that the bank 130/134 makes available to customers 122 via the customer-data network 110.

The secure website also provides access to the customer-education system 136, which is configured to provide the customer 122 with a clear view of all information used in developing their alternative-credit score 118. The customer-education system 136 also enables customers to test various scenarios to see whether certain changes in their financial relationship with the bank 130/134 will affect their alternative-credit score 118. This is useful, for example, in cases where the bank 130/134 may require additional information or require that the customer 122 increase its alternative-credit score 118, before approving the customer 122 for a loan at the best price. The customer-education system 136 can clearly provide information regarding how the customer 122 can improve its alternative-credit score 118 and meet the additional criteria necessary for obtaining the best rate. The customer-education system 136 also provides web-based seminars, and budgeting and financial planning materials.

The secure website also provides access to the product-pricing system 138, which shows the customers 122 their respective pricing tiers for various financial and insurance products. For example, the product-pricing system 138 uses pricing-tier criteria received from the bank 130/134 to determine the appropriate pricing tier for each customer 122 for various financial products offered by the bank 130/134. Also for example, the bank 130/134 may partner with affiliate insurance companies to offer, via the customer-data network 110, insurance products. Pricing for the insurance products may be determined by the product-processing system 138 and based, in part, on customers' 122 alternative-credit scores 118. The affiliated insurance companies benefit from direct access to the bank's customers 122 and the bank's customer-information database 128, which comprises personal and financial information 126a-b regarding its customers 122, in addition to benefiting from obtaining alternative-credit scores 118 instead of having to a pay a CRA for a credit score. These cost savings and access to customers and customer information enables insurance companies to offer discounted rates and premiums to the bank's customers 122. Those customers 122 with higher alternative-credit scores 118 will benefit from lower pricing tiers, while those customers 122 with lower alternative-credit scores 118 will benefit from bank-provided strategies, which are presented via the customer-education system 136 and designed to help customers increase their alternative-credit scores 118 and eventually reduce their insurance rates.

The customer-data network 110 may also include a marketing-incentive system 142 for incentivizing customers 122 to permit the sale of their information. FIG. 3 provides a flow chart illustrating an exemplary process 300 of using the marketing-incentive system 142 to provide customers 122 with a financial incentive to permit the bank 130/134 to sell their information to trusted affiliates of the customer-data network 110. As illustrated in block 302, customers 122 are given the option of participating in a marketing-incentive program that pays them money in exchange for their information. In block 304, demographic information is obtained from participating customers 122 and stored in the customer-information database 128. For example, the secure website may provide customers 122 with a "My Marketing Information" page. There, customers 122 may enter their demographic information, such as income level, shopping preferences, homeowner or renter, number of children, ethnicity, education level, age, etc. As shown in block 306, a trusted affiliate may submit a request to the bank 130/134 to buy a list of customers. The affiliate may specify specific demographic criteria, e.g., income level, households with children, etc. For example, the affiliate may request a list of homeowners with an income level of $50,000+ residing in a ten-mile radius of the affiliate's store locations.

As illustrated in block 310, the previously obtained demographic information is accessed and searched to identify which customers 122 meet the requested demographic criteria. The identified customers are then complied into a list, which is provided and sold to the requesting affiliate. And, as shown in block 314, the customers 122 included on the list receive financial compensation. For example, the bank 130/134 may deposit money in a customer's 122 checking account each time the customer 122 is included on a customer list.

In an embodiment the marketing-incentive system 142 is programmed to obtain the customer's 122 authorization before each sale event. For example, each time the customer's 122 demographic information matches a requesting affiliate's demographic criteria, the marketing-incentive system 142 is programmed to send a message, via the customer-data network 110, to the customer 122 requesting approval. In an embodiment, the message directs the customer 122 to the "My Marketing Information" page, where the customer 122 views, for example, information regarding the affiliate, the nature of how the affiliate plans to use the marketing information, and the amount the customer 122 will receive in exchange for being included on the customer list. This enables the customer's 122 to control which affiliates receive its marketing information and the extent to which its marketing information is disseminated.

Customers 122 can login to the "My Marketing Information" page at any time to update their account preferences and demographic information. For example, to increase the number of times a customer 122 is included on a list, and thereby increase the amount of money deposited in its account, the customer 122 can login into the "My Marketing Information" page and complete and/or update as many demographic-information fields as possible. The more demographic information the customer 122 provides, the more often that customer 122 will meet a requesting affiliate's demographic criteria. Also, for example, customers 122 can login to opt-out of the marketing incentive program at anytime.

The customer-data network 110 may also include employer-service system 146 to assist employers when making hiring determinations. If elected by a customer 122, for a fee to employers 134 and upon the employers' request, the bank 130/134, via the customer-data network 110 may send to the employer a summary report of the customer's 122 personal and financial data 126a-b and the customer's 122 alternative-credit score 118. While the summary report may not include the customers' 122 entire financial standing or credit relationships apart from the customer-data network 110, the summary report may give customers 122 having a relationship with the bank 130/134 a benefit from that relationship by reporting on their responsible handling of credit with the bank 130/134.

The customer-data network 110 may be equipped with a fraud-protection system 150. The fraud-protection system 150 may require that a customer 122 pass a positive identification test through the use of biometric-identity authentication, such as iris-scan-identity authentication, before the customer 122 can open a new account or make any important changes to an existing account. For example, iris-scan technology may be installed throughout bank's 130/134 branches, and, prior to opening a new account or updating important account information, customers 122 would physically go to one of the bank's 130/134 branches and have their identification verified. The fraud-protection system 150 also provides complete coverage in the event of fraudulent charges. The web-based interface of the fraud-protection system 150 includes links and contact information for law enforcement agencies to allow for fast reporting of fraudulent activity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for an institution having a large number of customers to create a program through which the customers receive incentive to permit the institution to sell information that belongs to the customers, the method comprising:
    inviting the customers to participate in the program;
    receiving, via a computing device, a plurality of demographic information from the customers;
    receiving, via a computing device, a request from a third party to purchase a customer list, wherein the request includes a plurality of demographic criteria;
    accessing, via computing device memory, the demographic information obtained from the customers;
    identifying, via a computing device processor, a plurality of customers whose demographic information matches the demographic criteria requested by the third party;
    obtaining, via a computing device processor, authorization from one or more of the plurality of customers for inclusion in the customer list based on the plurality of customers being identified as having demographic information that matches the demographic criteria; and
    constructing, via a computing device processor, the customer list comprising customers whose demographic information matches the demographic criteria requested by the third party and who have authorized their inclusion in the customer list,
    wherein the constructed customer list is subsequently sold to the third party and customers who were included in the customer list are compensated.

2. The method of claim 1, wherein obtaining authorization further comprises:
    communicating, via a computing device, a notification to the plurality customers whose demographic information matches the demographic criteria requested by the third party, wherein the notification requests customer consent for being included in the customer list; and
    receiving, via a computing device, an input from the one or more of the plurality of customers that indicates their consent for being included in the customer list.

3. The method of claim 2, wherein communicating the notification further comprises communicating, via the computing device, the notification, wherein the notification directs the plurality of customers to a web page configured to receive the input.

4. The method of claim 3, wherein communicating the notification further comprises communicating, via the computing device, the notification, wherein the notification directs the plurality of customers to the web page, wherein the web page is further configured to provide information identifying the third party and information related to the third party's intended use of the customer list.

5. The method of claim 3, wherein communicating the notification further comprises communicating, via the computing device, the notification, wherein the notification directs the plurality of customers to the web page, wherein the web page is further configured to provide a compensation that the plurality of customers will receive in exchange for being included in the customer list.

6. A computer program product for creating a program through which a plurality of customers of an institution receive incentive to permit the institution to sell information that belongs to the customers, the computer program product comprising a non-transitory computer readable medium having computer readable program instructions stored therein, wherein said computer readable program instructions comprise:
    first instructions configured to cause a computer to receive a plurality of demographic information from the customers;
    second instructions configured to cause a computer to receive a request from a third party to purchase a customer list, wherein the request includes a plurality of demographic criteria;
    third instructions configured to cause a computer to access the demographic information;
    fourth instructions configured to cause a computer to identify customers whose demographic information matches the demographic criteria requested by the third party;
    fifth instructions configured to cause a computer to obtain authorization from one or more of the plurality of customers for inclusion in the customer list based on the plurality of customers being identified as having demographic information that matches the demographic criteria;
    sixth instructions configured to cause a computer to construct the customer list comprising customers whose demographic information matches the demographic criteria requested by the third party and who have authorized their inclusion in the customer list,
    wherein the constructed customer list is subsequently sold to the third party and customers who were included in the customer list are compensated.

7. The computer program product of claim 6, further comprising:
    seventh instructions configured to cause a computer to provide a user interface though which the customers can enter the demographic information.

8. The computer program product of claim 6, wherein the demographic information comprises an income level, a plurality of shopping preferences, a number of children, an occupation, an education level, and an age.

9. The computer program product of claim 6, wherein the fifth instructions further comprise:
    seventh instructions configured to cause a computer to communicate a notification to the plurality customers whose demographic information matches the demographic criteria requested by the third party, wherein the notification requests customer consent for being included in the customer list; and
    eighth instructions configured to cause a computer to receive an input from the one or more of the plurality of customers that indicates their consent for being included in the customer list.

10. The computer program product of claim 9, wherein the seventh instructions are further configured to cause the computer to communicate the notification, wherein the notification directs the plurality of customers to a web page configured to receive the input.

11. The computer program product of claim 10, wherein the seventh instructions are further configured to cause the computer to communicate the notification, wherein the notification directs the plurality of customers to the web page that is configured to provide information identifying the third party and information related to the third party's intended use of the customer list.

12. The computer program product of claim 10, wherein the seventh instructions are further configured to cause the computer to communicate the notification, wherein the notification directs the plurality of customers to the web page that is configured to provide a compensation that the plurality of customers will receive in exchange for being included in the customer list.

13. A system, the system comprising:
   a computing platform including at least one processor and a memory in communication with the at least one processor; and
   a marketing incentive module stored in the memory, executable by the processor and configured to:
      receive a plurality of demographic information from the customers,
      receive a request from a third party to purchase a customer list, wherein the request includes a plurality of demographic criteria,
      access the demographic information obtained from the customers,
      identify a plurality customers whose demographic information matches the demographic criteria requested by the third party,
      obtain authorization from one or more of the plurality of customers for inclusion in the customer list based on the plurality of customers being identified as having demographic information that matches the demographic criteria, and
      construct the customer list comprising customers whose demographic information matches the demographic criteria requested by the third party and who have authorized their inclusion in the customer list,
      wherein the constructed customer list is subsequently sold to the third party and customers who were included in the customer list are compensated.

14. The system of claim 13, wherein the marketing incentive module is further configured to:
   communicate a notification to the plurality customers whose demographic information matches the demographic criteria requested by the third party, wherein the notification requests customer consent for being included in the customer list, and
   receive an input from the one or more of the plurality of customers that indicates their consent for being included in the customer list.

15. The system of claim 14, wherein the marketing incentive module is further configured to communicate the notification, wherein the notification directs the plurality of customers to a web page configured to receive the input.

16. The system of claim 15, wherein the marketing incentive module is further configured to communicate the notification, wherein the notification directs the plurality of customers to the web page that is configured to provide information identifying the third party and information related to the third party's intended use of the customer list.

17. The system of claim 15, wherein the marketing incentive module is further configured to communicate the notification, wherein the notification directs the plurality of customers to the web page that is configured to a compensation that the plurality of customers will receive in exchange for being included in the customer list.

* * * * *